Patented Feb. 6, 1945

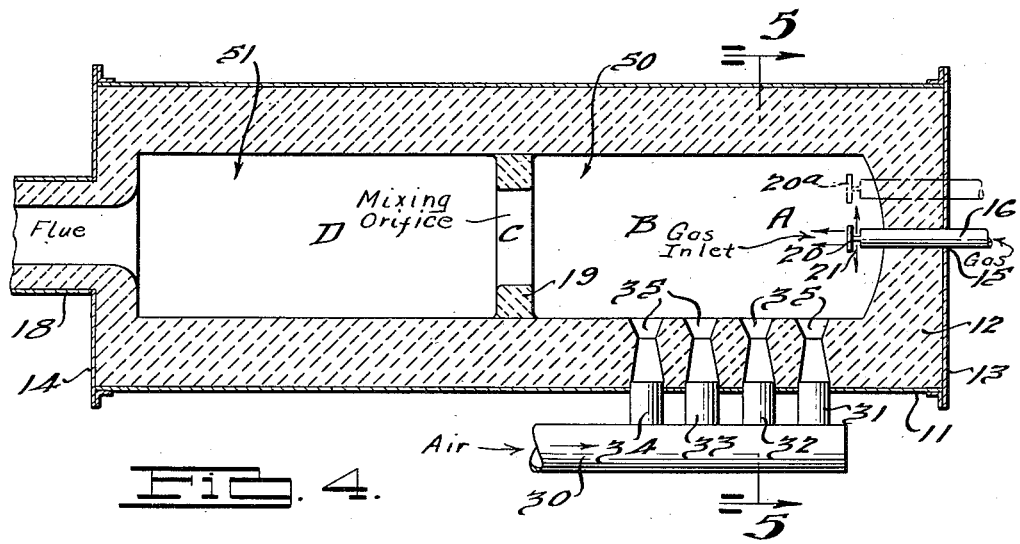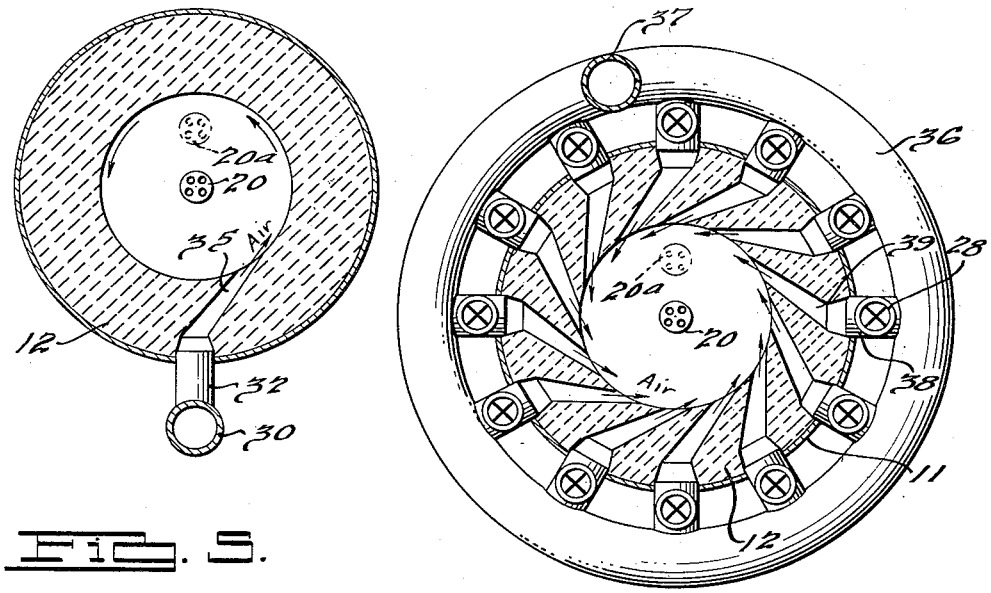

2,368,827

UNITED STATES PATENT OFFICE 2,368,827

APPARATUS FOR PRODUCING CARBON BLACK

Hilding Hanson, Charleston, W. Va., and Robert W. Skoog and Lolan H. Grisso, Borger, Tex., assignors to United Carbon Company, Inc., Charleston, W. Va., a corporation of Maryland Application April 21, 1941, Serial No. 389,522

4 Claims. (Cl. 23—259.5)

The present invention relates to a novel converter for producing carbon black by the decomposition of hydrocarbon gases, such for example as those contained in natural gas.

One of the objects of the present invention is to provide a novel converter for the treatment of hydrocarbon gases to produce a desired type of carbon black having predetermined properties. The converter is capable of operation so as to provide various commercially desirable types of carbon black.

A further object of the invention is to provide a converter which may be controlled to produce a relatively high commercial yield of the selected type of carbon black.

Another object of the invention is to provide a converter for producing carbon black by a continuous process of decomposition of hydrocarbon gases, the converter being relatively simple in structure and capable of a sustained and readily controlled operation.

Other objects and advantages of this invention will appear in the following description and appended claims, reference being had to the accompanying drawings forming a part of this specification wherein like reference characters designate corresponding parts in the several views.

In the drawings:

Fig. 4 is a view generally similar to Fig. 1 showing a modified embodiment of the present invention;

Fig. 5 is a section taken substantially on the line 5—5 of Fig. 4 looking in the direction of the arrows; and Fig. 6 is a section generally similar to Fig. 2 but showing a modified arrangement of air header and air injection ports.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
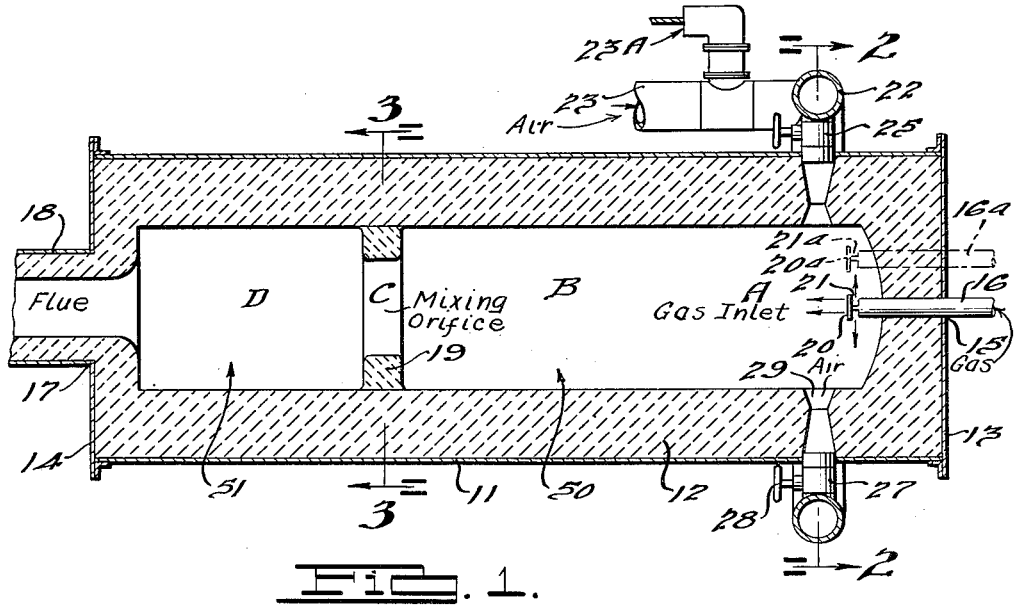
Fig. 1 is a longitudinal section showing a preferred form of converter embodying the present invention.
Figures 2, 3:
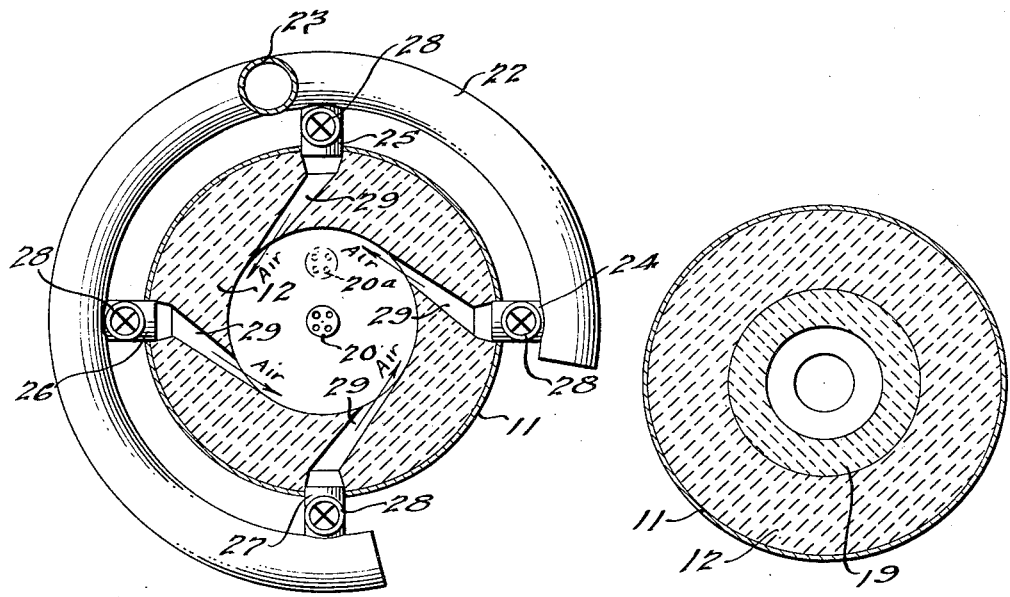
Fig. 2 is a section taken substantially on the line 2—2 of Fig. 1 looking in the direction of the arrows.
Fig. 3 is a section taken substantially on the line 3—3 of Fig. 1 looking in the direction of the arrows.

The accompanying drawings, particularly Figs. 1 and 2, show one form of a novel converter embodying the present invention. This converter comprises an outer steel casing 11 of any suitable construction which may be a single piece, as shown, or may be formed of a plurality of separate sections joined together in any suitable manner. In the converter construction illustrated in the drawings, it will be observed that the casing 11 is generally circular in cross section, thereby providing a generally cylindrical-shaped converter. While this shape is preferred, it will be understood that the converter casing 11 may be of any desired size and shape and consequently may be provided with cross-sectional configurations other than circular.

The casing or shell 11 is provided with ends 13 and 14. The end piece 13 is provided with a centrally located opening indicated at 15 through which the gas inlet conduit 16 extends to the center of the converter. The end piece 14 is provided with a centrally located opening 17 to which is connected the flue 18.

The casing 11 and end pieces 13 and 14 thus provide a complete outer shell for the converter and define the inner enclosed space within the converter. The inner walls of this shell are lined with a suitable heat-resisting refractory material, such for example as fire brick, which provides a refractory lining 12 therein. The refractory lining may follow the contour of the steel shell 11 and thus provide a substantially cylindrical interior in the furnace, or it may be placed therein to provide a series of separated zones. If desired, the refractory may be arranged in steps to provide different diameters and different sectional contours in the furnace, or it may be so arranged as to provide a sinuous path extending through the length of the converter. The refractory lining 12 may be formed of any desired type of refractory material which can be heated to approximately 3000° F. without undergoing excessive deterioration. The flue 18 also is lined with the same or a similarly refractory material.

The refractory material 12 may be laid up within the shell 11 and the flue 18 in the form of bricks or blocks bonded together by any suitable type of heat-resistant bonding mortar, such for example as fire clay or the like. If desired, however, the refractory material 12 may be used in the form of precast sections having a desired cross-sectional contour.

The reference numeral 19 indicates in general an annular mixing orifice formed of a suitable refractory material and located within the converter. While the drawings herein show the use of but one mixing orifice in the length of the converter, it is to be understood that more than one may be used if desired. The mixing orifice 19 is provided with a centrally positioned annulus (Fig. 3) and divides the converter into the communicating sections 50 and 51. If more than one of the mixing orifices 19 are used, it will be understood that more than two chambers would be provided within the converter. Also, it is to be understood that the shape of the mixing orifice may be varied as desired; for example, instead of being in the form of a true annulus, it may be in the form of a Venturi opening or it may be in the form of a restricted throat forming an integral part of the refractory lining inside the converter. While any suitable type of mixing orifice may be utilized, a generally annular orifice member, positioned as shown, is generally regarded as being the preferred structure.

The mixing orifice 19 may be located in various positions in the converter, but preferably is located nearer the flue 18 than it is to the gas inlet 16. Good results have been obtained if the mixing orifice 19 is placed at a point located approximately one-third of the length of the converter measured from the flue 18. Satisfactory production of carbon black also has been achieved by placing the orifice at approximately the center of the converter.

Gas is injected into the converter through the conduit 16 which is connected with a suitable source of hydrocarbon gas (not shown) and extends through the opening 15 in the end 13 to a point located within the converter. At the end of the conduit 16 inside the converter there is provided a perforated baffle 20 which is secured in spaced relation to the end of the conduit 16 to provide radially directed ports 21. In some instances the baffle 20 is eliminated and the present invention, therefore, is not limited thereto. The baffle 20 may, if desired, be a solid plate held by suitable supports on the end of the conduit 16. In this construction, the spaced radially directed ports 21 are also provided and gas injected through the conduit 16 will impinge upon the baffle 20 and be directed toward the side walls of the converter as well as longitudinally thereof in the manner indicated by the arrows in Fig. 1. The use of perforations in the baffle causes a portion of the gas to be discharged in the center of the converter.

While the single baffle 20 and conduit 16 comprise a preferred method of introducing gas into the converter, other suitable means may be used, such for example as that shown in the dotted line views of Figs. 1 and 2, which show a second conduit and baffle indicated as 16a and 20a, respectively. This construction provides a plurality of gas inlets so that the gas is introduced into the converter at a plurality of points. It will be understood that more than two such conduits and baffles may be used if desired, and it is also to be understood that the conduits and baffles may be spaced from each other and from the side walls of the converter in any other desired manner.

Air or a combustion-supporting gas is introduced into the converter through a duct and port system, one form of which is shown in Fig. 2. As there shown, this comprises a header 22 which connects with an air supply duct 23 to which air under pressure is supplied. The header 22 communicates with passages 24, 25, 26 and 27 which are spaced about the periphery of the chamber. Each of these passages is provided with a separate control valve or damper 28 and each is connected with a directional air induction port 29 formed in the refractory 12. Each of the air induction ports 29 extends on a line generally tangential to the interior of the converter. Thus the air is injected into the converter through the ports 29 in spaced generally tangential streams.

An alternate arrangement for introducing air or other combustion supporting gas into the converter is shown in Figs. 4 and 5. As there shown, a longitudinally extending header 30 is provided with laterally spaced separate ducts 31, 32, 33 and 34. Each duct 31, 32, 33 and 34 is connected with a substantially tangential air induction port 35 formed in the refractory lining 12 of the converter. The construction and arrangement of the converter shown in Figs. 4 and 5 are the same as that previously described in connection with Figs. 1 and 2 except for the location and arrangement of the directional air induction ports 35 and the location of the mixing orifice 19. In the construction shown in Figs. 4 and 5, the mixing orifice 19 is located approximately in the center of the converter. The orifice 19 may, if desired, be located approximately in the locations shown in Figs. 1 and 4. If desired, each of the ducts 31, 32, 33 and 34 may be provided with an air control valve or damper similar to the air control valve or damper 28 previously mentioned.

Another arrangement for introducing air or other combustion supporting gas is shown in Fig. 6. As there shown, we may provide a main header 36 which extends substantially circumferentially of the shell 11 and is connected with an air supply duct 37. A plurality of spaced separate air ducts 38, in this instance twelve in number, connect the main header 36 with the spaced directional air induction ports 39, each of which extends on lines generally tangential to the circumference of the inside of the converter.

Each of the ducts 38 is provided preferably with a control valve or damper similar to the control valve or damper 28 previously mentioned. The number and spacing of the ports through which air is introduced to the converter may be varied by means of the control valves 28, i. e., any one or more of the several valves may be closed, thus forcing the air into the remaining ducts in which the valves are open. In this manner the tangential velocity of the air within the converter can be varied at will. The converter construction is the same as that previously discussed in connection with Figs. 1 and 2 or Figs. 4 and 5.

In all of the embodiments of the present invention it is to be understood that the control valves and the air supply may be regulated manually if desired, or may be regulated by automatic draft control mechanism which is governed and controlled according to temperatures generated within the converter. For example, a conventional target and thermocouple (not shown) may be placed in the converter and adjusted to respond to temperature differences within predetermined limits at such point in the converter. Such a thermocouple is well known in the art and therefore is not shown. It may be electrically connected with automatic regulator means 23a controlling a master valve in the duct 23. If desired, the thermocouple may be electrically connected to control the speed of a power-driven blower (not shown), which supplies air to the duct 23. If the temperature within the converter is too low, additional amounts of air are injected so as to provide additional combustion within the converter. If the temperatures are too high, the amount of air is reduced so as to limit the amount of combustion permitted and heat generated in the furnace.

It is to be understood that any desired size and number of air induction ports and air ducts may be provided. The arrangement and location of the ports and ducts may be varied considerably within the scope of the present invention. It is desirable, however, that they be so arranged that all air streams injected into the converter will have a sufficient velocity and direction that they will move generally along the inner circumference of the refractory 12 in the converter. This assists in protecting the refractory against excessive deterioration from the heat generated inside the converter and also tends to prevent coking in the converter. It is desirable from the design standpoint that the size and arrangement of the ducts and air induction ports be such as to deliver the desired volume of air to the interior of the converter with a minimum of power.

If desired, the flue 18 may be incorporated as a part of the converter, or, if desired, the converter itself may take the form of an enlarged flue having separate sections designed to subject the gas passing therethrough to different heat treatments.

The operation of the converter is as follows:

Natural gas, preferably maintained at a constant rate and volume, is introduced through the conduit 16 and is baffled and directed by the baffle 20 so as to provide a plurality of separately directed gas streams. Air under pressure is introduced at the desired rate and volume through the generally tangential air induction ports 29, if the form of Figs. 1 and 2 is used, or the generally tangential ports 35 if the form of Figs. 4 and 5 is used, or the generally tangential air induction ports 39 if the form of Fig. 6 is used. This is indicated by the directional arrows appearing on the several views.

The air forms a swirling layer directed generally around the inner circumference of the refractory 12 inside the converter. The gas streams are diffused into and admixed with the swirling air streams. When a combustible mixture of air and gas has resulted, it is burned within the converter with a swirling active flame. The flame and the gas and air at the same time move longitudinally of the converter toward the flue 18 which is connected through the carbon collecting system (not shown) with the stack (not shown).

In all of the forms of the converter here shown and described, it will be seen that the air is introduced into the converter in an angular direction relative to the direction of introducing the gas into the converter. This causes a turbulent admixture of the air and gas in the converter.

In the construction shown in Figs. 4 and 5, air is successively injected into the burning mass as it passes each of the ports 35 connected with the ducts 31, 32, 33 and 34. While we have shown separate ports 35, it is to be understood that a preferred construction would use but one elongated port equal in length to the sum of the lengths of the separate ports 35 here shown.

The burning gases as they traverse the converter in any of the forms shown in the several views, are further mixed and blended as they pass the mixing orifice 19. As the mixture enters the chamber 51, there is thus a further turbulence due to the mixing of the burning gases, the unburned gases and any air which may not have combined during the travel through the forepart of the furnace.

The products of combustion and the decomposed gases carrying with them the produced carbon black pass out of the chamber 51 through the flue 18. The solid carbon black suspended in the produced gases is then isolated from the gases by any desired separating and collecting apparatus known to the art.

The amount of air and gas introduced into the combustion chamber is regulated carefully so that the mixture of gas and air is always such that a portion of the gas is not burned but is decomposed through heating by the burned gas and air mixture. Consequently the air supply conduit 23, 30 or 37 is connected with a suitable source of air under pressure, such for example as a power-driven blower. The quantity of air introduced is regulated by controlling the speed of such blower or by regulation of the master air control valve. Since the blowers and control mechanisms for such valve are well known in the art, they are not illustrated in the drawings, although their use in connection with the present apparatus is contemplated herein.

The amount of gas injected through the gas injecting tube 16 also is regulated carefully. For this purpose, any known suitable gas measuring and regulator device may be used. Metering valves, pressure regulators and other gas regulating means are also well known in the art and their use is contemplated herewith, although such regulating devices are not specifically illustrated in the drawings.

Since the quantities of air and gas introduced into the combustion chamber are regulated, and the gas is intermixed with air at a plurality of points to provide a turbulent mixing of the air and gas, the combustion permitted within the converter has been found to produce carbon black efficiently and with a relatively high yield of carbon black per unit of gas introduced into the converter. Moreover, the use of the mixing orifice 19 aids in this thorough mixing and has been found to be an important factor which assists in controlling the quality of the black.

In addition to producing a mixture of gas and air which provides a regulated amount of combustion of the gas, it is here pointed out that control of the quantities, direction and velocity of the gas and air introduced into the converter provides the control for the temperatures within the converter. Moreover, these temperatures may be controlled and varied at various points in the converter by controlling the quantities of air introduced. By thus controlling the temperature within the converter, not only are the reactions rendered more efficient for the production of carbon black, but it also is possible thereby to control the characteristics of the carbon black produced.

No claim is made herein to any process which may be carried out in the present form of converter. One such process is shown in co-pending application Serial No. 389,523 filed in the names of Hilding Hanson and Robert W. Skoog, in which is disclosed an improved and novel process for producing carbon black in a converter such as that disclosed herein. This process may be carried out in the present converter, although it is specifically understood that said process may also be carried out in other apparatus and that the present apparatus may be utilized in connection with other processes.

The selection of the sizes, numbers and placement of the air inlet ports is controlled and may be varied in a converter of the present invention to provide a substantially uniform distribution of the air inside the converter at pressures which require a relatively low power consumption. The spacing of the ports determines to a large extent the uniformity of the air distribution, while the sizes and numbers of the ports determine the air pressures required to deliver a given volume of air to the converter during a given time interval. The desired volume of air to be delivered through the ports in a given time interval is regulated to provide the desired temperatures within the converter.

It has been found that the circumferential placement of the ports, as shown in Figs. 1, 2 and 6, is preferable in some respects to the longitudinal placement thereof as shown in Figs. 4 and 5. This is true particularly where space is an important factor, since the use of circumferentially spaced ports permits the use of a more compact air distributing system than does the use of the longitudinally spaced ports.

The multi-directional streams of gas and the generally tangential streams of air are turbulently admixed inside the converter and when combustion occurs a further turbulence is created in the gas, air and products of combustion which completely fill the combustion chamber of the converter and move toward the flue.

From the foregoing it will be seen that the converter is essentially an elongated reaction chamber. In operation it has been found that there are in effect a series of zones within the converter which are indicated generally by the letters A, B, C and D on the several views. These zones vary in size and extent with the adjustment of the air and gas and with the particular form of air injection system employed. In general, however, they occupy the relative positions indicated on the drawings by such letters. The initial zone A is a mixing zone in which the gas and air which enter the zone at approximately atmospheric temperatures, are mixed and subjected to rapid heating to the desired temperature. The second zone B is the zone of initial reaction. Here the gas and air mixture is burned at a regulated temperature to initiate the decomposition of the unburned gas. The third zone C is the mixing orifice zone where the hot products of combustion and the undecomposed natural gases and any remaining air are blended and mixed to assure a full utilization of all oxygen then present in the mixture and the completion of the desired combustion of the air and gas mixture and further decomposition of any gas for which no oxygen is available for combustion. The fourth zone D is a refining zone in which the gases and the entrained carbon which pass through the mixing orifice zone are subjected to heat treatment for a predetermined time and at a predetermined temperature.

From the refining zone, the gases pass through the flue, where they are cooled and where the suspended carbon is collected therefrom.

The air and gas which is mixed to form a combustible mixture is burned with a turbulent active flame. The entire converter is filled with the resultant flame and with the products of combustion and decomposition of the gas. Due to the relatively large volume of air, its relatively high velocity and the tangential direction by which it enters the converter, the air tends to provide a blanket or sheet chiefly of inert gases between the refractory of the converter and the turbulent flame therein. The gas blanket or sheet is broken up and mixed with the gases during their passage through the mixing orifice zone C. Thus by the time the gas is passed to the refining zone D, any oxygen then present in the air blanket or sheet is available to complete the desired reaction in the refining zone D. Due to this arrangement, the present process may be operated in a continuous process without requiring intermittent or cyclic operations, one cycle of which would be given over to the removal of coke or deposited carbon formed in the converter during a preceding heat treatment of the carbon containing gas.

In operation, it is contemplated that the converter shall be used to provide a heat transfer from burned gases to a gas which is to be thermally decomposed. Thus, it is important to control the quantity of air and gas introduced into the converter so that only part of the natural gases will undergo complete combustion.

If desired, the air and the gas which are introduced into the converter may be preheated. This may be done by any suitable method but preferably is done by providing for a heat exchange between the heated products of combustion and the incoming air and gas, as for example by utilizing the flue 18 as a portion of the heat exchange. It is also to be understood that some of the gaseous products of combustion may be recirculated through the converter in such a way that some of the heat present in such gases may be imparted to the air-gas mixture which enters the furnace.

We claim:

1. A converter for producing carbon black from hydrocarbon gases, which comprises a substantially cylindrical refractory lined reaction chamber provided at one end with a flue outlet, a gas conducting conduit located adjacent the center of the other end of the said chamber and having an open end extending into said chamber, a baffle member positioned adjacent the open end of said conduit for directing toward the walls of the chamber a portion of the gas ejected from the conduit, an air injecting system including air inlet passages located at a plurality of spaced circumferential points and extending on lines substantially tangent to the circumference of the inner walls of said chamber and at an angle to the line of direction of said gas conducting conduit and opening into the reaction chamber at a plurality of spaced points, air conducting ducts communicating with said passages, and an annular mixing orifice having a single centrally disposed opening surrounded by a solid collar located in said chamber between said flue outlet and said air and gas inlets.

2. A converter for producing carbon black from hydrocarbon gases, which comprises a substantially cylindrical refractory lined reaction chamber provided at one end with a flue outlet and at the opposite end with a baffle gas injecting tube and a separate air inlet duct system, said baffle adapted to direct gas toward the wall of the chamber a mixing orifice comprising a single centrally disposed opening surrounded by a solid collar and located in said chamber between said flue outlet and said gas tube and said air inlet duct system, said inlet duct system including a plurality of radially spaced ports extending into said chamber at a plurality of spaced circumferential points on lines generally tangential to the circumference of the inner wall and at an angle to the center line of said gas injecting tube, and an air supply duct communicating with said ports to supply air to said chamber.

3. A converter for producing carbon black by the thermal decomposition of hydrocarbon gases, which comprises a substantially cylindrical refractory lined reaction chamber provided at one end with a flue outlet, a gas injecting tube extending horizontally into an opposite end of said chamber, a baffle associated with the discharge end thereof to direct the discharged gas stream toward the walls of said chamber, a mixing orifice comprising a centrally located open passageway surrounded by a solid collar secured to the refractory lining of said chamber and located between said flue outlet and said gas injecting means to divide said chamber into a plurality of compartments communicating with each other through said open passageway, a plurality of radially spaced air induction ports located at a plurality of spaced circumferential points and connected with a source of air under pressure and communicating with one of said compartments, each of said ports extending on lines generally tangential to the circumference of the said refractory lined chamber and located at a plurality of radially spaced points adjacent the end of said chamber through which said gas injecting tube extends.

4. A converter for producing carbon black from hydrocarbon gases, which comprises a substantially cylindrical refractory lined reaction chamber provided at one end with a flue outlet, a gas conducting conduit located adjacent the center of the other end of the said chamber and having an open end extending into said chamber, a baffle member positioned adjacent the open end of said conduit for directing toward the walls of the chamber a portion of the gas ejected from the conduit, an air injecting system including air inlet passages located at a plurality of spaced longitudinal points extending on lines substantially tangent to the circumference of the inner walls of said chamber and at an angle to the line of direction of said gas conducting conduit and opening into the reaction chamber at a plurality of spaced points, air conducting ducts communicating with said passages, and an annular mixing orifice having a single centrally disposed opening surrounded by a solid collar located in said chamber between said flue outlet and said air and gas inlets.

HILDING HANSON.
ROBERT W. SKOOG.
LOLAN H. GRISSO.